(12) United States Patent
Hwang et al.

(10) Patent No.: US 7,859,960 B2
(45) Date of Patent: Dec. 28, 2010

(54) INFORMATION RECORDING MEDIUM, RECORDING/REPRODUCING METHOD, AND RECORDING/REPRODUCING APPARATUS

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 11/956,718

(22) Filed: Dec. 14, 2007

(65) Prior Publication Data

US 2008/0117775 A1 May 22, 2008

Related U.S. Application Data

(63) Continuation of application No. 11/074,933, filed on Mar. 9, 2005.

(30) Foreign Application Priority Data

May 25, 2004 (KR) .............................. 2004-37535

(51) Int. Cl.
*G11B 7/00* (2006.01)
(52) U.S. Cl. .................... 369/47.14; 369/53.15
(58) Field of Classification Search .............. 369/47.14, 369/53.15
See application file for complete search history.

(56) References Cited

U.S. PATENT DOCUMENTS

| | | | | |
|---|---|---|---|---|
| 5,111,444 A | * | 5/1992 | Fukushima et al. ...... | 369/53.17 |
| 5,715,221 A | * | 2/1998 | Ito et al. ................... | 369/47.14 |
| 6,160,778 A | | 12/2000 | Ito et al. | |
| 6,336,202 B1 | | 1/2002 | Tsuchimoto et al. | |
| 6,385,148 B2 | * | 5/2002 | Ito et al. ................... | 369/47.14 |
| 6,526,522 B1 | | 2/2003 | Park et al. | |
| 6,963,523 B1 | | 11/2005 | Park | |
| 2003/0156471 A1 | | 8/2003 | Ueda et al. | |
| 2003/0210627 A1 | | 11/2003 | Ijtsma et al. | |
| 2004/0071056 A1 | * | 4/2004 | Park et al. ................. | 369/47.14 |
| 2004/0145980 A1 | * | 7/2004 | Park et al. ................. | 369/47.14 |

(Continued)

FOREIGN PATENT DOCUMENTS

CN 1321976 11/2001

(Continued)

OTHER PUBLICATIONS

Office Action dated Jun. 6, 2008 of the Chinese Patent Application No. 200510072172.0.

(Continued)

*Primary Examiner*—Van N Chow
(74) *Attorney, Agent, or Firm*—NSIP Law

(57) ABSTRACT

An information recording medium, a method of recording and/or reproducing data to/from the medium, and a recording/reproducing apparatus using the medium, the medium having a data area including a user data area to record user data, and a spare area to record replacement blocks that replace defect blocks occurring in the user data area, wherein defect list entries include status information of the defect blocks and the replacement blocks, and the status information of the defect blocks in the user data area is changed, and the status information of the replacement blocks in the spare area is changed, in response to the spare area being newly allocated to re-initialize the medium.

10 Claims, 16 Drawing Sheets

U.S. PATENT DOCUMENTS

| | | | |
|---|---|---|---|
| 2005/0207319 A1* | 9/2005 | Park | 369/124.07 |
| 2008/0117763 A1 | 5/2008 | Hwang et al. | |
| 2008/0117764 A1 | 5/2008 | Hwang et al. | |
| 2008/0117775 A1 | 5/2008 | Hwang et al. | |
| 2009/0262617 A1 | 10/2009 | Ai | |

FOREIGN PATENT DOCUMENTS

| | | |
|---|---|---|
| EP | 1560216 | 8/2005 |
| EP | 1650761 | 4/2006 |
| JP | 2000-40308 | 2/2000 |
| JP | 2000-322838 | 11/2000 |
| JP | 2004-30892 | 1/2004 |
| JP | 2005-339773 | 12/2005 |
| JP | 2008-171561 | 7/2008 |
| JP | 2008-171562 | 7/2008 |
| KR | 2000-34797 | 6/2000 |
| WO | WO 2005/109432 | 11/2005 |

OTHER PUBLICATIONS

"Standard ECMA-330: 120 mm (4,7 Gbytes per side) and 80 mm (1,46 Gbytes per side) DVD Rewritable Disk (DVD-RAM)", Jun. 2002, ECMA, Geneva, XP002310606, whole document.

Office Action issued in corresponding European Patent Application No. 05252949.2 dated Sep. 26, 2008.

Office Action issued in Korean Patent Application No. 2004-37535 on Dec. 16, 2005.

Malaysian Office Action and Search Report issued on Nov. 20, 2009, in counterpart Malaysian Application No. PI 20051823 citing prior art cited in Korean Office Action issued on Dec. 15, 2005, in counterpart Korean Application No. 10-2004-0037535 (published as KR 10-2005-0112530), which was cited in Information Disclosure Statement of Dec. 31, 2007 (3 pages, in English).

Taiwanese Preliminary Notice of First Office Action issued on May 24, 2010, in corresponding Taiwanese Application No. 096148954 (6 pages).

Japanese Office Action issued on Jun. 22, 2010, in corresponding Japanese Application No. 2005-142937 (2 pages).

* cited by examiner

DFL ENTRY BEFORE RE-INITIALIZATION

| STATUS INFORMATION 1 | PHYSICAL ADDRESS OF DEFECT BLOCK | STATUS INFORMATION 2 | PHYSICAL ADDRESS OF REPLACEMENT BLOCK |
|---|---|---|---|
| 1 | 0010000h | 0 | . . . |
| 2 | 0010100h | 0 | . . . |
| 3 | 0010110h | 0 | . . . |
| . . . | . . . | . . . | . . . |

DFL ENTRY AFTER RE-INITIALIZATION

| STATUS INFORMATION 1 | PHYSICAL ADDRESS OF DEFECT BLOCK | STATUS INFORMATION 2 | PHYSICAL ADDRESS OF REPLACEMENT BLOCK |
|---|---|---|---|
| 3 | 0010000h | 1 | . . . |
| 3 | 0010100h | 1 | . . . |
| 3 | 0010110h | 1 | . . . |
| . . . | . . . | . . . | . . . |

FIG. 10A

DFL ENTRY BEFORE RE-INITIALIZATION

| STATUS INFORMATION 1 | PHYSICAL ADDRESS OF DEFECT BLOCK | STATUS INFORMATION 2 | PHYSICAL ADDRESS OF REPLACEMENT BLOCK |
|---|---|---|---|
| 1 | 0010000h | 0 | ⋮ |
| 2 | 0010100h | 0 | ⋮ |
| 3 | 0010110h | 0 | ⋮ |
| 5 | ⋮ | 0 | 0100000h |
| ⋮ | ⋮ | ⋮ | ⋮ |

FIG. 10B

DFL ENTRY AFTER RE-INITIALIZATION

| STATUS INFORMATION 1 | PHYSICAL ADDRESS OF DEFECT BLOCK | STATUS INFORMATION 2 | PHYSICAL ADDRESS OF REPLACEMENT BLOCK |
|---|---|---|---|
| 3 | 0100000h | 1 | 0010000h |
| 5 | ⋮ | 1 | 0010100h |
| 5 | ⋮ | 1 | 0010110h |
| 5 | ⋮ | 1 | ⋮ |
| ⋮ | ⋮ | ⋮ | ⋮ |

FIG. 11A

DFL ENTRY OF SINGLE POSSIBLE DEFECTIVE BLOCK

| "3" | PHYSICAL ADDRESS OF DEFECT BLOCK | "0" | 1 |
|---|---|---|---|

FIG. 11B

DFL ENTRIES OF SEQUENTIAL POSSIBLE DEFECTIVE BLOCK (LENGTH KNOWN)

| "3" | STARTING PHYSICAL ADDRESS OF SEQUENTIAL DEFECT BLOCKS | "0" | 5 |
|---|---|---|---|

FIG. 11C

DFL ENTRIES OF SEQUENTIAL POSSIBLE DEFECTIVE BLOCK (LENGTH UNKNOWN)

| "3" | STARTING PHYSICAL ADDRESS OF SEQUENTIAL DEFECT BLOCKS | "0" | FFh |
|---|---|---|---|

0001000h

ALLOCATE NEW SPARE AREA 0001000h    0001010h

DFL ENTRY BEFORE RE-INITIALIZATION

| STATUS INFORMATION 1 | PHYSICAL ADDRESS OF DEFECT BLOCK | STATUS INFORMATION 2 | PHYSICAL ADDRESS OF REPLACEMENT BLOCK |
|---|---|---|---|
| 3 | 0001000h | 0 | 5 |
| ... | ... | ... | ... |

DFL ENTRY AFTER RE-INITIALIZATION

| STATUS INFORMATION 1 | PHYSICAL ADDRESS OF DEFECT BLOCK | STATUS INFORMATION 2 | PHYSICAL ADDRESS OF REPLACEMENT BLOCK |
|---|---|---|---|
| 3 | 0001010h | 1 | 3 |
| 5 | ... | 1 | 0001000h |
| 5 | ... | 1 | 0001001h |
| ... | ... | ... | ... |

FIG. 15A

DFL ENTRY BEFORE RE-INITIALIZATION

| STATUS INFORMATION 1 | PHYSICAL ADDRESS OF DEFECT BLOCK | STATUS INFORMATION 2 | PHYSICAL ADDRESS OF REPLACEMENT BLOCK |
|---|---|---|---|
| 3 | 0000100h | 0 | FFh |
| ... | ... | ... | ... |

FIG. 15B

DFL ENTRY WHEN STARTING ADDRESS OF SEQUENTIAL DEFECT BLOCKS EXISTS IN USER DATA AREA AFTER RE-INITIALIZATION

| STATUS INFORMATION 1 | PHYSICAL ADDRESS OF DEFECT BLOCK | STATUS INFORMATION 2 | PHYSICAL ADDRESS OF REPLACEMENT BLOCK |
|---|---|---|---|
| 3 | 000010h | 0 | FFh |
| ... | ... | ... | ... |

FIG. 15C

DFL ENTRY WHEN STARTING ADDRESS OF SEQUENTIAL DEFECT BLOCKS EXISTS IN SPARE AREA AFTER RE-INITIALIZATION

| STATUS INFORMATION 1 | PHYSICAL ADDRESS OF DEFECT BLOCK | STATUS INFORMATION 2 | PHYSICAL ADDRESS OF REPLACEMENT BLOCK |
|---|---|---|---|
| 4 | ... | 1 | 0000100h |
| 5 | ... | 1 | 0000101h |
| ... | ... | ... | ... |

INFORMATION RECORDING MEDIUM, RECORDING/REPRODUCING METHOD, AND RECORDING/REPRODUCING APPARATUS

CROSS-REFERENCE TO RELATED APPLICATIONS

This application is a continuation of U.S. patent application Ser. No. 11/074,933, filed on Mar. 9, 2005, now pending, which claims the benefit of Korean Patent Application No. 2004-37535, filed on May 25, 2004, in the Korean intellectual Property Office, the disclosures of which are incorporated herein by reference.

BACKGROUND OF THE INVENTION

1. Field of the Invention

The present invention relates to a disc, and, more particularly, to an information recording medium, a recording/reproducing method, and a recording/reproducing apparatus for re-initializing the medium.

2. Description of the Related Art

The number of defects in a re-writable information storage medium increases due to scratches, fingerprints, or dust existing on the medium during use of the medium. Defect blocks occurring while using the medium are managed by being registered as defect information, and a host or a drive system tries not to allocate data to the defect blocks, but to record data in non-defect blocks. As such, when the medium is continuously used, the number of such defect blocks will increase. Accordingly, a user will desire to re-initialize the medium.

In this case, the defect blocks registered in the defect information after the user has removed the fingerprints or dust from the surface of the medium can be determined to be satisfactory non-defect blocks by disc verification after recording data. As such, when re-initialization of the re-writable information storage medium is required, the drive system determines defect possibilities of blocks in recordable areas of the entire medium, or defect blocks registered in the defect information, through verification after recording.

The recording of the defect blocks that are registered in the defect information or in the entire medium, and then determining whether the blocks are defective through disc verification when re-initializing the re-writable information storage medium, can be inconvenient for users because it takes too much time to re-initialize the medium.

SUMMARY OF THE INVENTION

The present invention provides an information recording medium, a recording/reproducing method, and a recording/reproducing apparatus to quickly re-initialize the medium.

Additional aspects and/or advantages of the invention will be set forth in part in the description which follows and, in part, will be obvious from the description, or may be learned by practice of the invention.

According to an aspect of the present invention, there is provided an information recording medium including a data area, wherein the data area comprises a user data area to record user data, and a spare area to record replacement blocks that replace defect blocks occurring in the user data area; defect list entries include status information of the defect blocks and the replacement blocks; and the status information of defect blocks which remain in the user data area after newly allocating the spare area during re-initialization is changed to indicate the defect blocks remaining in the user data area have been re-initialized and have a possible defect.

The defect blocks occurring in the user data area before newly allocating the spare area may include at least one of a defect block with a replacement block, a defect block without a replacement block, a possible defective block, or a combination thereof.

According to another aspect of the present invention, there is provided an information recording medium including a data area, wherein the data area comprises a user data area to record user data, and a spare area to record replacement blocks that replace defect blocks occurring in the user data area; defect list entries include status information of the defect blocks and the replacement blocks; and the status information of defect blocks which are located in a newly allocated spare area after allocating the newly allocated spare area during re-initialization is changed to indicate the defect blocks located in the newly allocated spare area have been re-initialized and are unusable as the replacement blocks.

According to another aspect of the present invention, there is provided an information recording medium including a data area, wherein the data area comprises a user data area to record user data, and a spare area to record replacement blocks that replace defect blocks occurring in the user data area; defect list entries include status information of the defect blocks and the replacement blocks; and the status information of replacement blocks that are unusable to replace the defect blocks is changed to indicate defect blocks that have been re-initialized and have a possible defect in response to the unusable replacement blocks, which are located in the spare area before newly allocating the spare area, being located in the user data area after re-initialization of the medium.

According to another aspect of the present invention, there is provided an information recording medium including a data area, wherein the data area comprises a user data area to record user data, and a spare area to record replacement blocks that replace defect blocks occurring in the user data area; defect list entries include status information of the defect blocks and the replacement blocks; and the status information of the defect blocks in the user data area is changed, and the status information of the replacement blocks in the spare area is changed, in response to the spare area being newly allocated to re-initialize the information recording medium.

The defect list entries may include physical address information of the defect blocks or the replacement blocks, first status information indicating whether the replacement blocks are usable or unusable or a defect status of the defect blocks, and second status information indicating whether the information recording medium has been re-initialized.

The defect list entries regarding defect blocks which remain in the user data area after the spare area is newly allocated during re-initialization may be changed to include first status information indicating the defect blocks remaining in the user data area have a possible defect, and second status information indicating the defect blocks remaining in the user data area have been re-initialized.

The defect list entries regarding defect blocks which are located in a newly allocated spare area after allocating the newly allocated spare area during re-initialization may be changed to include first status information indicating the defect blocks located in the newly allocated spare area are unusable as the replacement blocks, and second status information indicating the defect blocks located in the newly allocated spare area have been re-initialized.

The defect list entries of replacement blocks that are unusable to replace the defect blocks may be changed to include first status information indicating defect blocks that have a possible defect, and second status information indicating the defect blocks having a possible defect have been re-initialized, in response to the replacement blocks that are unusable to replace the defect blocks, which are located in the spare area before newly allocating the spare area, being located in the user data area after re-initialization.

Verification of sequential blocks may be performed in response to a sequential defect list entry existing regarding the sequential blocks which comprise at least two possible defective blocks continuously disposed, and a length of the sequential blocks not being known, before allocating a new spare area; the sequential defect list entry may be registered to include first status information indicating a verification result, and second status information indicating re-initialization, in response to the sequential blocks remaining in the user data area after re-initialization; and the sequential defect list entry may be registered to include first status information indicating the sequential blocks are usable or unusable to replace the defect blocks, and second status information indicating re-initialization, in response to the sequential blocks being located in the newly allocated spare area after the re-initialization.

A sequential defect list entry may be maintained in response to the sequential defect list entry existing regarding sequential blocks comprising at least two possible defective blocks continuously disposed, and a length of the sequential blocks not being known, before allocating a new spare area, and a first block included in the sequential blocks, which was included in the sequential blocks before newly allocating the spare area, being located in the user data area after re-initialization; and the sequential defect list entry may be registered to include first status information indicating the sequential blocks are usable or unusable to replace the defect blocks according to verification of the sequential blocks, and second status information indicating re-initialization, in response to the sequential blocks being located in the newly allocated spare area after the re-initialization.

According to another aspect of the present invention, there is provided a recording/reproducing method comprising newly allocating a spare area while re-initializing an information recording medium in which a user data area to record user data, and the spare area to record replacement blocks to replace defect blocks occurring in the user data area, are arranged, wherein defect list entries include status information regarding the defect blocks and replacement blocks; and changing status information of defect blocks which remain in the user data area after newly allocating the spare area to indicate the defect blocks remaining in the user data area have been re-initialized and have a possible defect.

According to another aspect of the present invention, there is provided a recording/reproducing method comprising newly allocating a spare area while re-initializing an information recording medium in which a user data area to record user data, and the spare area to record replacement blocks to replace defect blocks occurring in the user data area, are arranged, wherein defect list entries include status information regarding the defect blocks and replacement blocks; and changing status information of defect blocks which are located in the newly allocated spare area after allocating the newly allocated spare area to indicate the defect blocks located in the newly allocated spare area have been re-initialized and are unusable as the replacement blocks.

According to another aspect of the present invention, there is provided a recording/reproducing method comprising newly allocating a spare area while re-initializing an information recording medium in which a user data area to record user data, and a spare area to record replacement blocks to replace defect blocks occurring in the user data area, are arranged, wherein defect list entries include status information regarding the defect blocks and replacement blocks; and changing status information of replacement blocks that are unusable to replace the defect blocks to indicate defect blocks that have been re-initialized and have a possible defect in response to the unusable replacement blocks, which are located in the spare area before newly allocating the spare area, being included in the user data area after re-initialization.

According to another aspect of the present invention, there is provided a recording/reproducing method comprising newly allocating a spare area while re-initializing an information recording medium in which a user data area to record user data, and a spare area to record replacement blocks to replace defect blocks occurring in the user data area, are arranged, wherein defect list entries include status information regarding the defect blocks and replacement blocks; and changing status information of the defect blocks in the user data area, and status information of the replacement blocks in the spare area.

According to another aspect of the present invention, there is provided a recording/reproducing apparatus comprising a reading/writing unit to read data from and/or write data on an information recording medium having a user data area to record user data, a spare area to record replacement blocks that replace defect blocks occurring in the user data area, and defect list entries including status information of the defect blocks and the replacement blocks; and a controlling unit to control the reading/writing unit to newly allocate the spare area to re-initialize the information recording medium, and change status information of defect blocks which remain in the user data area after re-initialization to indicate the defect blocks remaining in the user data area have been re-initialized and have a possible defect.

According to another aspect of the present invention, there is provided a recording/reproducing apparatus comprising a reading/writing unit to read data from and/or write data on an information recording medium having a user data area to record user data, a spare area to record replacement blocks that replace defect blocks occurring in the user data area, and defect list entries including status information of the defect blocks and the replacement blocks; and a controlling unit to control the reading/writing unit to newly allocate the spare area to re-initialize the information recording medium, and change status information of defect blocks which are located in the newly allocated spare area after re-initialization to indicate the defect blocks located in the newly allocated spare area have been re-initialized and are unusable as the replacement blocks.

According to another aspect of the present invention, there is provided a recording/reproducing apparatus comprising a reading/writing unit to read data from and/or write data on an information recording medium having a user data area to record user data, a spare area to record replacement blocks that replace defect blocks occurring in the user data area, and defect list entries including status information of the defect blocks and the replacement blocks; and a controlling unit to control the reading/writing unit to newly allocate the spare area to re-initialize the information recording medium, and change status information of replacement blocks that are unusable to replace the defect blocks to indicate defect blocks that have been re-initialized and have a possible defect in response to the unusable replacement blocks, which are located in the spare area before re-initialization, being located in the user data area after re-initialization.

According to another aspect of the present invention, there is provided a recording/reproducing apparatus comprising a reading/writing unit to read data from and/or write data on an information recording medium having a user data area to record user data, a spare area to record replacement blocks that replace defect blocks occurring in the user data area, and defect list entries including status information of the defect blocks and the replacement blocks; and a controlling unit to control the reading/writing unit to newly allocate the spare area to re-initialize the information recording medium, change status information of the defect blocks and the replacement blocks, and then record the status information.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 10A illustrates status information of the DFL entry before allocating the new spare areas to a data area illustrated in FIG. 9A;

FIG. 10B illustrates status information of the DFL entry after allocating the new spare areas to the data area illustrated in FIG. 9B;

FIGS. 11A through 11C illustrate three DFL entries when the status information 1 is set to "3," which indicates a block may have a defect according to an embodiment of the present invention;

FIGS. 15A through 15C illustrate a change in DFL entries in the situations illustrated in FIGS. 14A through 14C.

DETAILED DESCRIPTION OF THE EMBODIMENTS

Figure 1:
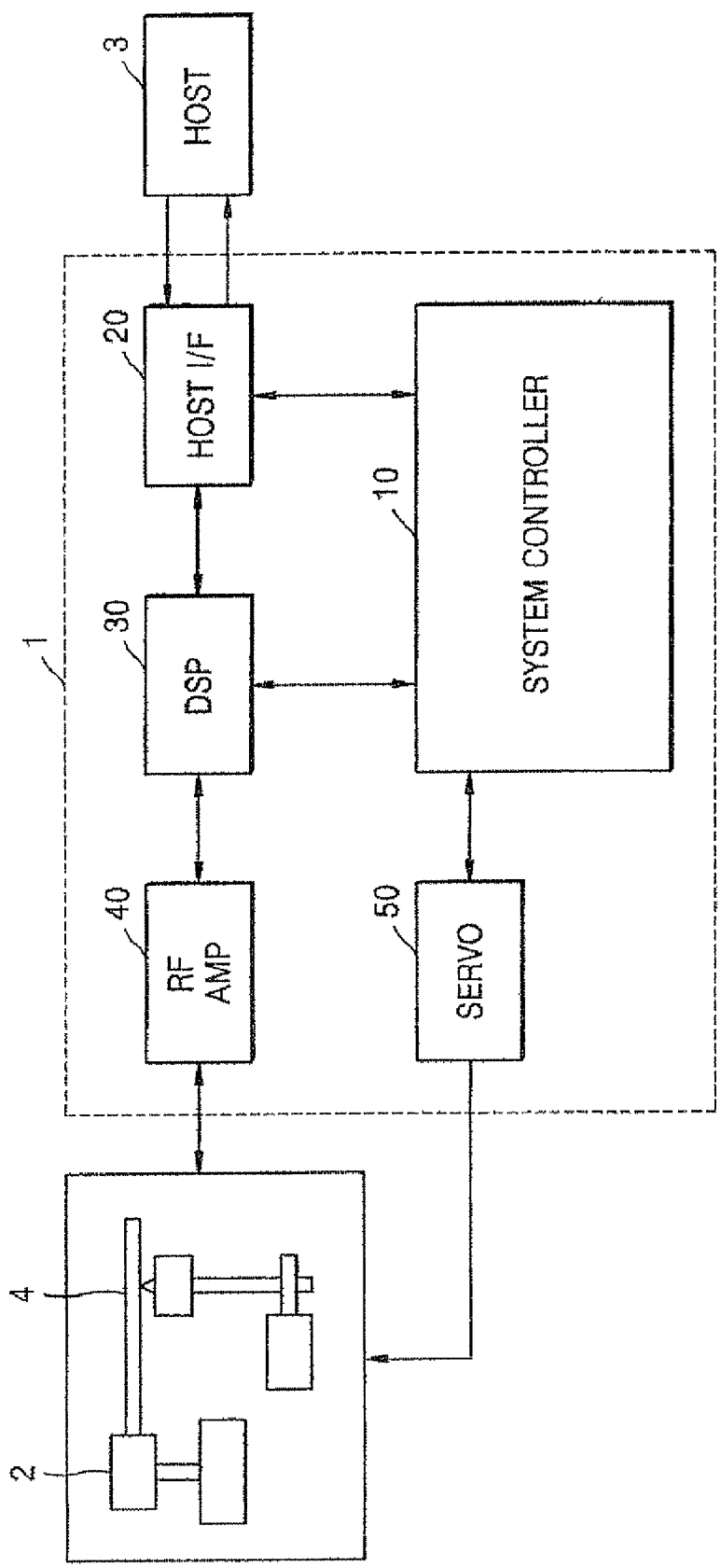
FIG. 1 is a block diagram of a recording/reproducing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a recording/reproducing apparatus according to an embodiment of the present invention.

Referring to FIG. 1, the recording/reproducing apparatus includes a reading/writing unit 2 and a controlling unit 1.

The reading/writing unit 2 includes a pickup, and writes data on an information recording medium, which in this embodiment is a disc 4, or reads recorded data from the disc 4.

The controlling unit 1 controls the reading/writing unit 2 to write data on or read data from the disc 4 according to a predetermined file system. In particular, the controlling unit 1 newly allocates a spare area to re-initialize the disc 4, and manages status information of defect blocks in a user data area and replacement blocks in the spare area according to the allocating result.

The controlling unit 1 includes a system controller 10, a host interface (I/F) 20, a digital signal processor (DSP) 30, a radio frequency amplifier (RF AMP) 40, and a servo 50.

When recording data on the disc 4, the host I/F 20 receives a predetermined write command output from a host 3, and transmits the write command to the system controller 10. The system controller 10 controls the DSP 30 and the servo 50 to perform the write command received from the host I/F 20. The DSP 30 adds additional data such as parity encoding to data received from the host I/F 20, which is to be recorded on the disc 4, to error-correct the data; performs error correcting code (ECC) encoding to any occurring ECC block, which is an error correcting block; and then modulates the ECC block in a predetermined method. The RF AMP 40 converts the data output from the DSP 30 to an RF signal. The reading/writing unit 2, which includes the pickup, records the RF signal transmitted from the RF AMP 40 on the disc 4. The servo 50 receives a command needed for servo control from the system controller 10, and servo controls the pickup of the reading/writing unit 2.

In particular, the system controller 10 manages the defect status of blocks when a spare area is newly allocated for re-initializing the disc 4.

The system controller 10 changes a defect list (DFL) entry of a defect block into a DFL entry having status information that indicates the defect block is re-initialized and has a possibility of a defect, and controls the reading/writing unit 2 to write the DFL entry on the disc 4 when it is determined that a physical address of the defect block in a user data area, established before the disc re-initialization, is still included in the user data area after a new spare area is allocated by the disc re-initialization.

In addition, the system controller 10 changes a DFL entry of a replacement block to a DFL entry having status information that indicates the replacement block is re-initialized and is unusable for replacement when it is determined that a physical address of a defect block in a user data area before disc re-initialization is included in a physical address of the replacement block of a new spare area after the new spare area is allocated by disc re-initialization.

Furthermore, the system controller 10 changes a DFL entry of a defect block into a DFL entry having status information that indicates the defect block is re-initialized and has a possible defect not yet verified when it is determined that a physical address of a replacement block that is unusable for replacement in a spare area before disc re-initialization is included in a physical address of a user data area after a new spare area is allocated by disc re-initialization. The DFL entry and the status information will be described in more detail later.

When reproducing data from the disc 4, the host I/F 20 receives a read command from the host 3. The system controller 10 performs initialization needed for reproduction. The reading/writing unit 2 emits a laser beam onto the disc 4, and outputs an information signal obtained by receiving the laser beam reflected from the disc 4. The RF AMP 40 converts the information signal output from the reading/writing unit 2 into an RF signal, and provides modulated data obtained from the RF signal to the DSP 30, and a servo signal to the servo 50 obtained from the RF signal to control the servo 50.

The DSP 30 demodulates the modulated data, and outputs data obtained by administering an ECC error correction to the demodulated data. Meanwhile, the servo 50 receives the servo signal output from the RF AMP 40, and the command for the servo control output from the system controller 10, and performs the servo control on the pickup. The host I/F 20 transmits the data received from the DSP 30 to the host 3.

A structure of the information recording medium according to an embodiment of the present invention will now be described.

Figure 2:
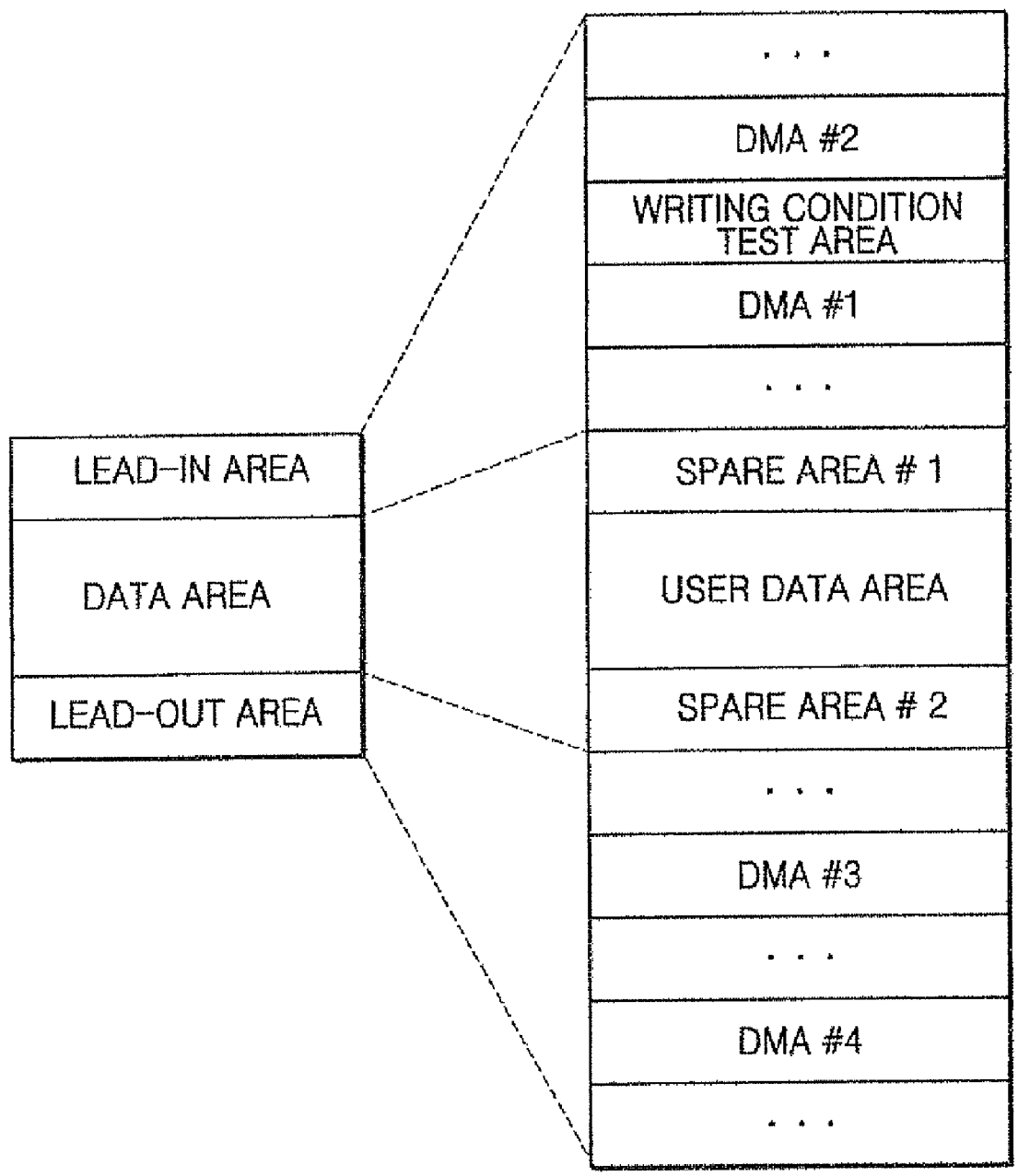
FIG. 2 is a structural diagram of a single recording layer disc according to an embodiment of the present invention.

FIG. 2 is a structural diagram of a single recording layer disc according to an embodiment of the present invention.

Referring to FIG. 2, a disc includes a lead-in area at an inner circumference of the disc, a lead-out area at an outer circumference of the disc, and a data area therebetween in a radial direction of the disc.

The lead-in area includes a defect management area (DMA) #2, a writing condition test area, and a DMA #1. The data area includes a spare area #1, a user data area, and a spare area #2. The lead-out area includes a DMA #3 and a DMA #4.

The DMA is an area in which to record defect management information of a re-writable information storage medium. The DMA is disposed at an inner area and/or an outer area of the disc.

When a defect occurs at a predetermined area of the user data area of the disc, a determination of whether to allocate spare areas to write therein, and a replacement block to replace a defect block in which the defect has occurred, and the sizes of the spare areas and/or replacement block, is made by a user or a drive manufacturer at an initializing stage of the data area. The spare areas may be newly allocated when the disc needs to be re-initialized while using the disc.

Defect management information that is recorded in the DMA is composed of a DFL for defect information, and a disc definition structure (DDS) which includes information regarding a structure of the data area.

The DFL is composed of a DFL header and a DFL entry. The format of the DFL will be described in more detail subsequently with reference to FIG. 4.

The writing condition test area is used to test various recording powers in order to obtain the best power for recording data and variables.

Figure 3:
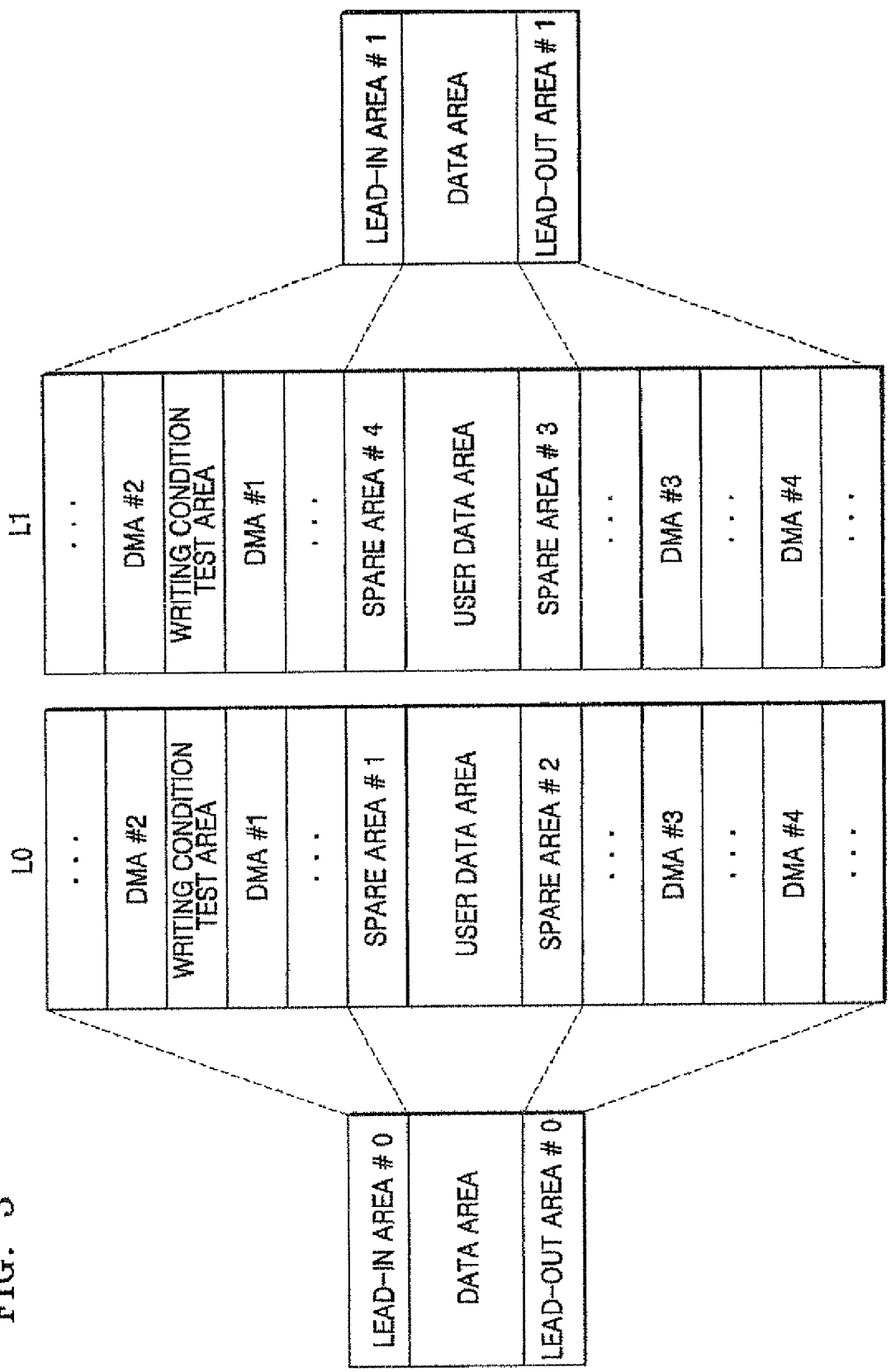
FIG. 3 is a structural diagram of a double recording layer disc according to an embodiment of the present invention.

FIG. 3 is a structural diagram of a double recording layer disk according to an embodiment of the present invention.

Referring to FIG. 3, a recording layer L0 includes a lead-in area #0, a data area, and a lead-out area #0, and another recording layer L1 includes a lead-in area #1, a data area, and a lead-out area #1.

The lead-in area #0 of the L0 layer includes a DMA #2, a writing condition test area, and a DMA #1. The data area of the L0 layer includes a spare area #1, a user data area, and a spare area #2. The lead-out area #0 of the L0 layer includes a DMA #3 and a DMA #4.

The lead-in area #1 of the L1 layer includes a DMA #2, a writing condition test area, and a DMA #1. The data area of the L1 layer includes a spare area #4, a user data area, and a spare area #3. The lead-out area #1 of the L1 layer includes a DMA #3 and a DMA #4.

Figure 4:
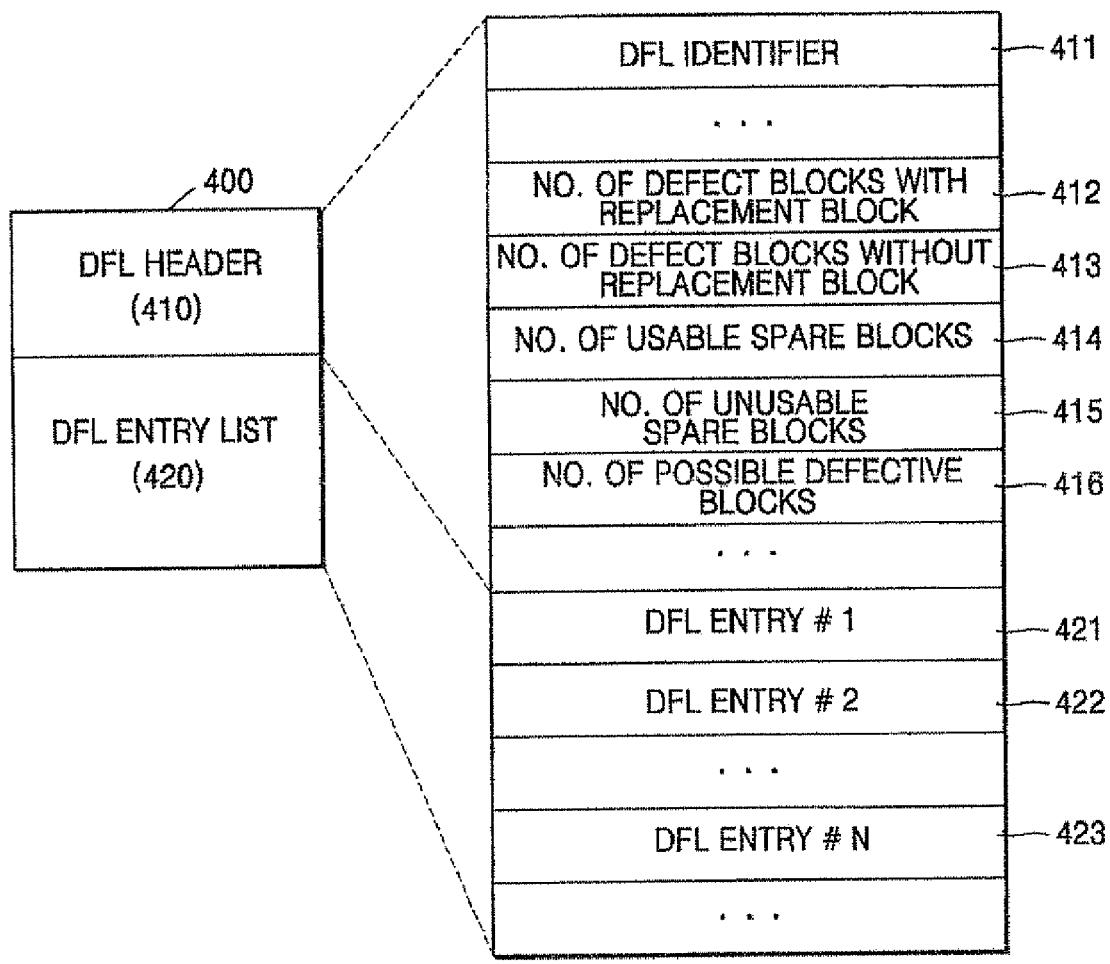
FIG. 4 is a structural diagram of data of a defect list (DFL) according to an embodiment of the present invention.

FIG. 4 is a structural diagram of a data format of a DFL 400 according to an embodiment of the present invention.

Referring to FIG. 4, the DFL 400 includes a DFL header 410 and a DFL entry list 420.

Number information for a defect management of blocks is written in the DFL header 410. The DFL header 410 includes a DFL identifier 411, a number 412 of defect blocks with a replacement block, a number 413 of defect blocks without a replacement block, a number 414 of usable spare blocks, a number 415 of non-usable spare blocks, and a number 416 of blocks with a possible defect.

The number 412 of the defect blocks with the replacement block denotes the number of DFL entries having defect status information indicating that defect blocks have been replaced with replacement blocks within a spare area.

The number 413 of the defect blocks without the replacement block denotes a number of DFL entries having defect status information indicating defect blocks without replacement blocks in the spare area.

The number 414 of the usable spare blocks denotes the number of DFL entries having defect status information indicating blocks that are usable for replacement among unreplaced blocks in the spare area.

The number 415 of the unusable spare blocks denotes the number of DFL entries having defect status information indicating blocks that are unusable for replacement among unreplaced blocks in the spare area.

The number 416 of the possible defective blocks denotes the number of DFL entries having defect status information indicating possible defective blocks that are not yet verified as defective among the blocks in the user data area.

The DFL entry list 420 is a collection of DFL entries having defect status information regarding various blocks. The DFL entry list 420 includes a DFL entry #1 421, a DFL entry #2 422, . . . , through a DFL entry #N 423.

Figure 5:
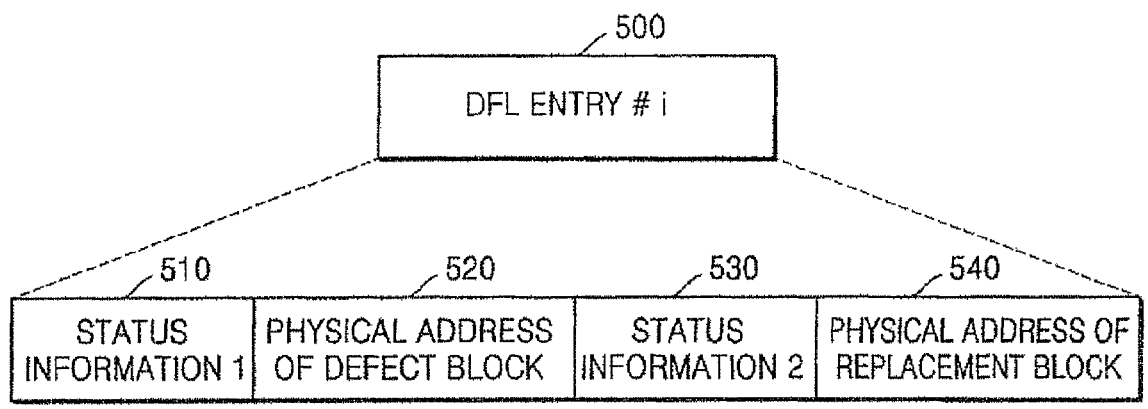
FIG. 5 is a structural diagram of data of a DFL entry such as illustrated in FIG. 4.

FIG. 5 is a structural diagram of a data format of a DFL entry #i 500 such as illustrated in FIG. 4.

Referring to FIG. 5, the DFL entry #i 500 includes status information 1 510, a physical address of a defect block 520, status information 2 530, and a physical address of a replacement block 540.

The status information 1 510 is information regarding a defect status of the defect blocks in the user data area, and information regarding the status of whether the replacement blocks in the spare area are usable. The status information 1 510 will be described in more detail later with reference to FIG. 6.

The status information 2 530 is information regarding the status of whether the replacement blocks in the spare area are usable. As such, by only indicating that the disc is re-initialized in the status information 2 530 of the DFL entry #i 500, without going through the verification operation after re-initializing the disc, re-initialization of the disc can be performed quickly. In addition, if the status information 2 530 of the DFL entry #i 500 of the block on which the data is to be recorded is set as the status information indicating the disc has been re-initialized when recording data after the re-initialization of the disc, a drive system knows that the disc has been re-initialized, and so can pad a predetermined amount of data in the rest of the block and record the data without going through an additional read-modify-write process, even if the host 3 commands to record data in a predetermined area of the block. Furthermore, the drive system knows that the data recorded in the block is invalid data if the status information 2 530 is set to indicate the disc has been re-initialized when a reproduction command output form the host 3 is received, and thus null data or a check message is immediately transmitted to the host 3.

The physical address 520 of the defect block is a physical address at which the defect block is located in the user data area, and the physical address 540 of the replacement block is a physical address at which the replacement block is located in the spare area.

Figure 6:
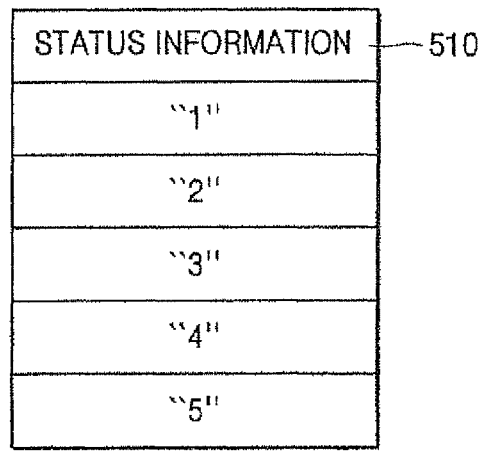
FIG. 6 illustrates status information of the DFL entry illustrated in FIG. 5.

FIG. 6 illustrates the status information 1 510 of the DFL entry #i 500 illustrated in FIG. 5.

Referring to FIG. 6, the status information 1 510 includes five states, "1," "2," "3," "4," and "5."

Status information "1" indicates the status of a defect block with a replacement block. In this case, a physical address of the defect block indicates a physical address of a defect block in the user data area, and a physical address of the replacement block is a physical address at which a replacement block that replaces the defect block is written in the spare area.

Status information "2" indicates the status of a defect block without a replacement block. In this case, a physical address of the defect block indicates a physical address of a replacement block in the user data area.

Status information "3" indicates the status of a possible defective block. The possible defective block is a block that is not yet verified by error correction after recording data when excess RF signals or servo signals are detected during disc verification or scanning, but has a possibility of a defect and so needs to be verified through error correction after recording data in the future. In this case, a physical address of the defect block indicates a physical address of a possible defective block but has not yet been verified.

Status information "4" indicates the status of a usable replacement block in the spare area. In this case, a physical address of the replacement block indicates a physical address of the usable block among unused replacement blocks in the spare area.

Status information "5" indicates the status of an unusable replacement block in the spare area. In this case, a physical address of the replacement block indicates a physical address of an unusable block among unused replacement blocks in the spare area.

The status information "1," "2," and "3" indicate the status of blocks in the user data area, and the status information "4" and "5" indicate the status of blocks in the spare area.

The status information 2 530 is not illustrated in FIG. 6, but, for example, the disc is re-initialized if the status information 2 530 is set to "1," and the disc is not re-initialized, or is used after re-initialization, if the status information 2 530 is set to "0." If the status information 2 530 is set to "0," valid data is recorded in the block. If the status information 2 530 is set to "1," valid data is not recorded in the block since the block has been re-initialized.

Figure 7A:
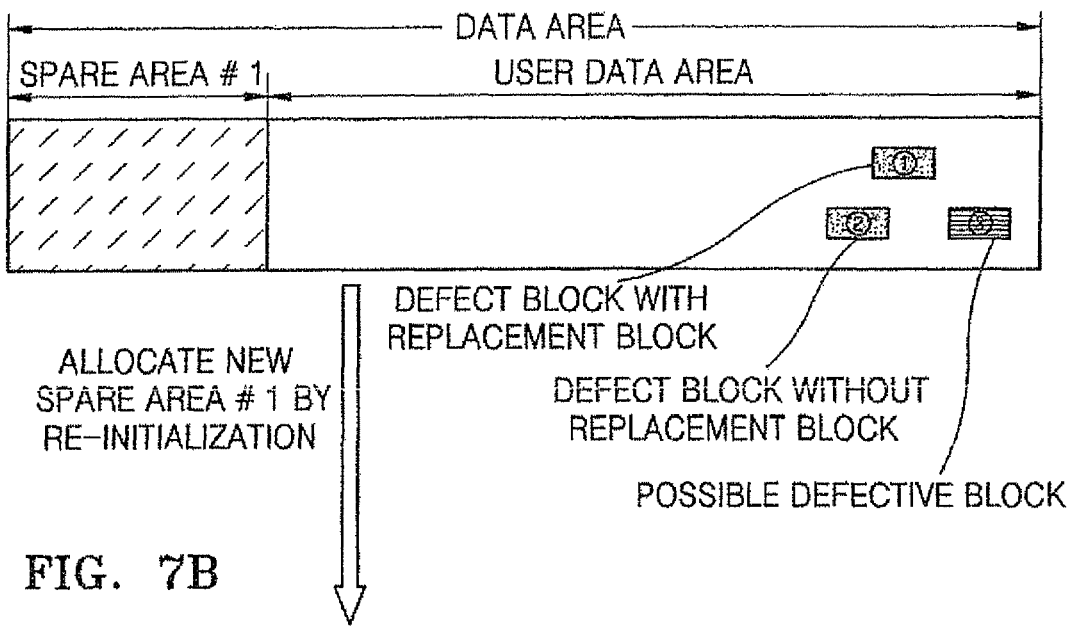
FIGS. 7A and 7B illustrate a method of processing a DFL entry of blocks within a spare area that is newly allocated in a disc after re-initializing the disc according to an embodiment of the present invention.
Figure 7B:
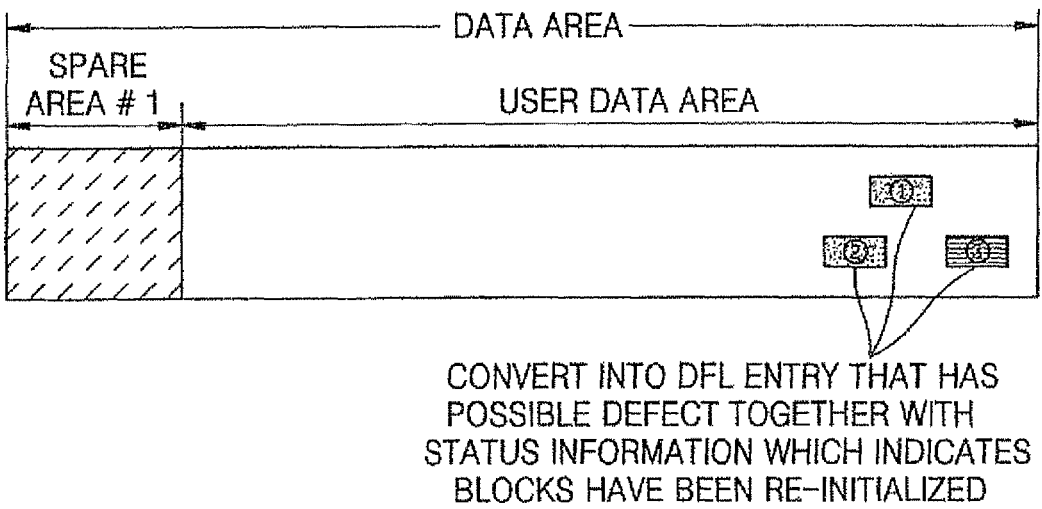

FIGS. 7A and 7B illustrate a method of processing a DFL entry of blocks in a spare area that is newly allocated in a disc after re-initializing the disc according to an embodiment of the present invention.

FIG. 7A illustrates a data block in a single recording layer disc which allocates and uses a spare area #1 before disc re-initialization, and FIG. 7B illustrates the data block with a new spare area #1 allocated therein after disc re-initialization.

Referring to FIG. 7A, the data area has only the spare area #1 allocated therein, and includes the spare area #1 and a user data area. Blocks ①, ②, and ③ are recorded at the end of the user data area. The block ① is a defect block and has a replacement block to replace the defect block. The block ② is a defect block that does not have a replacement block to replace the defect block. The block ③ is a possible defective block.

FIG. 7B illustrates the data area when the defect blocks still exist in the user data area after disc re-initialization, when the new spare area #1 is allocated in the data area by disc re-initialization while using the disc in the present state.

Referring to FIG. 7B, DFL entries of the block ① with the replacement block, the block ② without the replacement block, and the block ③ with a possible defect are converted into DFL entries having status information with a possible defect together with status information that the blocks ①, ②, and ③ are re-initialized.

Figures 8A, 8B:
FIG. 8A illustrates status information of the DFL entry before allocating the new spare area to a data area illustrated in FIG. 7A.
FIG. 8B illustrates status information of the DFL entry after allocating the new spare area to the data area illustrated in FIG. 7B.

FIG. 8A illustrates the status information of the DFL entry before allocating the new spare area #1, according to this embodiment of the present invention, to the data area illustrated in FIG. 7A. FIG. 8B is a view of the status information of the DFL entry after allocating the new spare area #1, according to this embodiment of the present invention, to the data area illustrated in FIG. 7B.

Referring to FIG. 8A, the DFL entry for the block ① is the first entry listed in FIG. 8A. Since the block ① is the defect block with the replacement block, status information 1 is set to "1," a physical address of the defect block is registered as "0010000h," and status information 2 is set to "0" since the defect block is not yet re-initialized. Since the block ② is the defect block without the replacement block, status information 1 is set to "2," a physical address of the defect block is registered as "10010100h," and status information 2 is set to "0" since the defect block is not yet re-initialized. Since the block ③ is the possible defective block, status information 1 is set to "3," a physical address of the block is registered as "0010110h," and status information 2 is set to "0" since the block is not yet re-initialized.

The DFL entry list illustrated in FIG. 8A changes into a DFL entry list as illustrated in FIG. 5B by re-initialization, which newly allocates the spare area #1.

Referring to FIG. 8B, the DFL entry for the block ① is the first entry listed in FIG. 8B, the DFL entry for the block ② is the second entry in FIG. 8B, and the DFL entry for the block ③ is the third entry in FIG. 8B. Status information 1 of the DFL entries for the blocks ①, ②, and ③ are all set to "3," which indicates that they are possible defective blocks due to disc re-initialization, and status information 2 of the DFL entries for the blocks ①, ②, and ③ are all set to "1," which indicates that they have been re-initialized.

As such, the defect blocks in the user data area after disc re-initialization are possible defective blocks. Therefore, when wanting to record data on the blocks, the blocks preferably, though not necessarily, should be checked for a defect by the disc verification process after recording data on the disc.

The status information 2 needs to be changed to "0" if the block is used again after setting the status information 2 of the DFL entry as "1," which indicates the disc has been re-initialized, by re-initializing the disc. The status information 2 is set to "1" to indicate the data recorded in the block has become invalid due to re-initializing the disc.

Figure 9A:
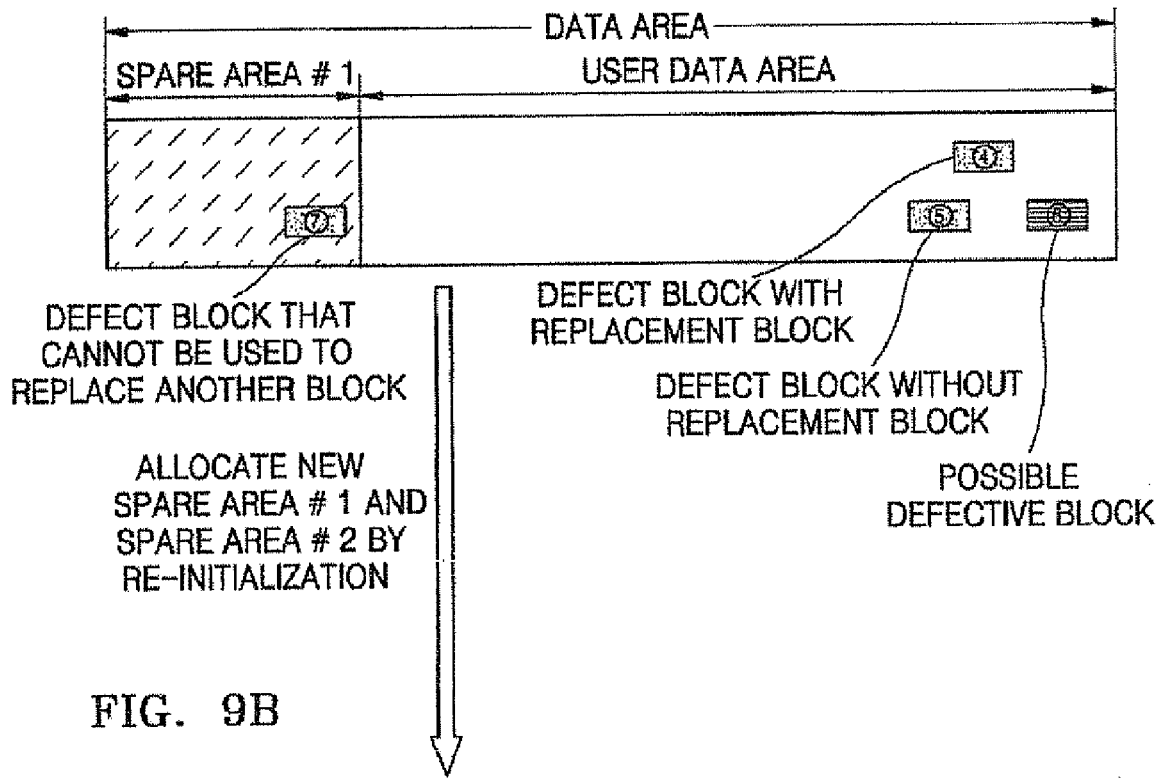
FIGS. 9A and 9B illustrate a method of processing a DFL entry of blocks within a spare area that is newly allocated in a disc after re-initializing the disc according to an embodiment of the present invention.
Figure 9B:
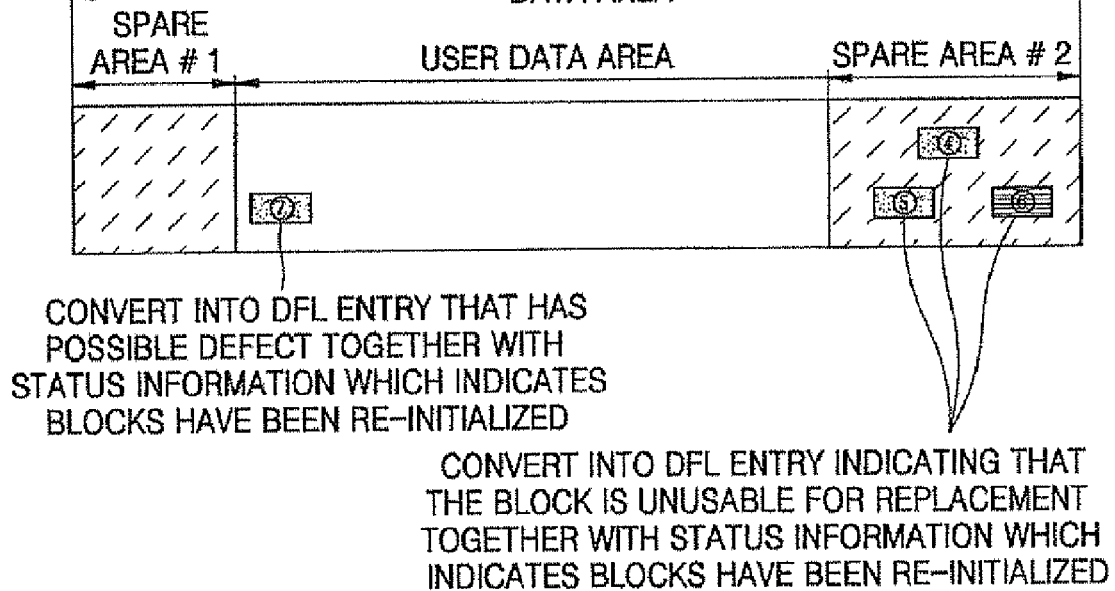

FIGS. 9A and 9B illustrate a method of processing a DFL entry of blocks within a spare area that is newly allocated in the disc after re-initializing the disc according to an embodiment of the present invention.

FIG. 9A illustrates a data block in a single recording layer disc which allocates and uses a spare area #1 before disc re-initialization, and FIG. 9B illustrates the data block with a new spare area #2 allocated therein after disc re-initialization.

Referring to FIG. 9A, a data area has only the spare area #1 allocated therein, and the data area includes the spare area #1 and a user data area. Blocks ④, ⑤, and ⑥ are recorded at the end of the user data area, and block ⑦ is recorded in the spare area #1. The block ④ is a defect block and has a replacement block to replace the defect block. The block ⑤ is a defect block that does not have a replacement block to replace the defect block. The block ⑥ is a possible defective block. The block ⑦ is a replacement block located in the spare area #1 which cannot be used to replace another block.

FIG. 9B illustrates a state of the data area in which the spare area #1 is reduced when newly allocated by the re-initialization of the disc while using the disc, and the block ⑦ that was located in the spare area #1 before re-initialization is located in the user data area after re-initialization. Also, a spare area #2 is newly allocated in the data area, and the blocks ④, ⑤, and ⑥ that were located in the user data area before re-initialization are located in the spare area #2.

Referring to FIG. 9B, if the blocks ④, ⑤, and ⑥, which were in the user data area before re-initialization, are included in the spare area #2 after re-initialization, DFL entries of the blocks ④, ⑤, and ⑥ are changed into DFL entries having status information indicating all the blocks ④, ⑤, and ⑥ have been re-initialized, together with status information indicating they are unusable for replacement. In addition, if the block ⑦, which was located in the spare area #1 before re-initialization, is located in the user data area after re-initialization, a DFL entry of the block ⑦ is changed into a DFL entry having status information indicating the block ⑦ has been re-initialized, together with status information indicating it has a possible defect.

FIG. 10A illustrates the status information of the DFL entry before allocating the new spare areas #1 and #2 to the data area illustrated in FIG. 9A, and FIG. 10B illustrates the status information of the DFL entry after allocating the new spare areas #1 and #2 to the data area illustrated in FIG. 9B.

Referring to FIG. 10A, the DFL entry for the block ④ is the first entry listed in FIG. 9A. Since the block ④ is the defect block with the replacement block, status information 1 is set to "1," a physical address of the defect block is registered as "0010000h," and status information 2 is set to "0," since the defect block is not yet re-initialized. Since the block ⑤ is the defect block without the replacement block, status information 1 is set to "2," a physical address of the defect block is registered as "0010100h," and status information 2 is set to "0," since the defect block is not yet re-initialized. Since the block ⑥ is the possible defective block, status information 1 is set to "3," a physical address of the block is registered as "0010110h," and status information 2 is set to "0" since the block is not yet re-initialized.

The DFL entry list illustrated in FIG. 10A changes into a DFL entry list as illustrated in FIG. 10B by re-initialization, which newly allocates the spare areas #1 and #2.

Referring to FIG. 10B, the DFL entry for the block ④ is the second entry listed in FIG. 10B, the DFL entry for the block ⑤ is the third entry in FIG. 10B, the DFL entry for the block ⑥ is the fourth entry in FIG. 10B, and the DFL entry for the block ⑦ is the first entry in FIG. 10B. Status information 1 of the DFL entries for the blocks ④, ⑤, and ⑥ are all set to "5," which indicates that they are blocks that cannot be used for replacement, by disc re-initialization, Status information 2, which indicates the state of re-initialization, of the blocks ④, ⑤, and ⑥ are all set to "1" indicating that they have been re-initialized, and a physical address of the defect block moves to the location of a physical address of the replacement block. Status information 1 of the DFL entry for the block ⑦ is set to "3," which indicates it has a possibility of a defect, status information 2 is set to "1," and a physical address of the replacement block moves to the location of a physical address of the defect block.

Up to now, the description was related to a single recording layer disc, but the same method applies to a double recording layer disc.

A processing method of a sequential defect block in which defect occurs in a series will be described now with reference to FIGS. 11A through 15C.

FIGS. 11A through 11C illustrate three DFL entries when the status information 1 is set to "3," which indicates a block may have a defect.

FIG. 11A is a view of a DFL entry of a single possible defective block.

Referring to FIG. 11A, status information 1 of the DFL entry is set to "3," which indicates the block may have a defect, a physical address of a defect block indicates a physical address of the possible defective block, status information 2 is set to "0," which indicates re-initialization is not yet performed, and a physical address of a replacement block is registered as "1," which indicates the block is a single block.

FIG. 11B is a view of a DFL entry of sequential defect blocks with a known length of a possible defect.

Referring to FIG. 11B, status information 1 of the DFL entry is set to "3," which indicates the sequential defect blocks may have a defect, a physical address of a defect block indicates a starting physical address of the sequential defect blocks, status information 2 is set to "0," which indicates re-initialization is not yet performed, and a physical address of a replacement block is registered as "5," which indicates the length of the sequential defect blocks.

FIG. 11C is a view of a DFL entry of sequential defect blocks with an unknown length of a possible defect.

Referring to FIG. 11C, status information 1 of the DFL entry is set to "3," which indicates the sequential defect blocks may have a defect, a physical address of a defect block indicates a starting physical address of the sequential defect blocks, status information 2 is set to "0," which indicates re-initialization is not yet performed, and a physical address of a replacement block is registered as a predetermined value "FFh," since the length of the sequential defects block is unknown.

Figure 12A:
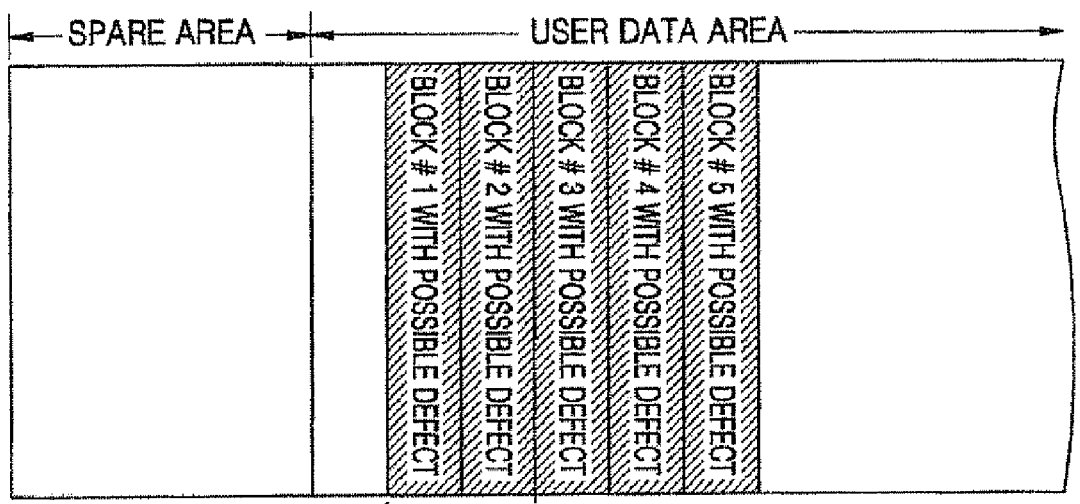
FIGS. 12A and 12B illustrate some sequential defect blocks with a known length of the defect existing in a newly allocated spare area, whereas the rest of the sequential defect blocks are in a user data area according to an embodiment of the present invention.
Figure 12B:
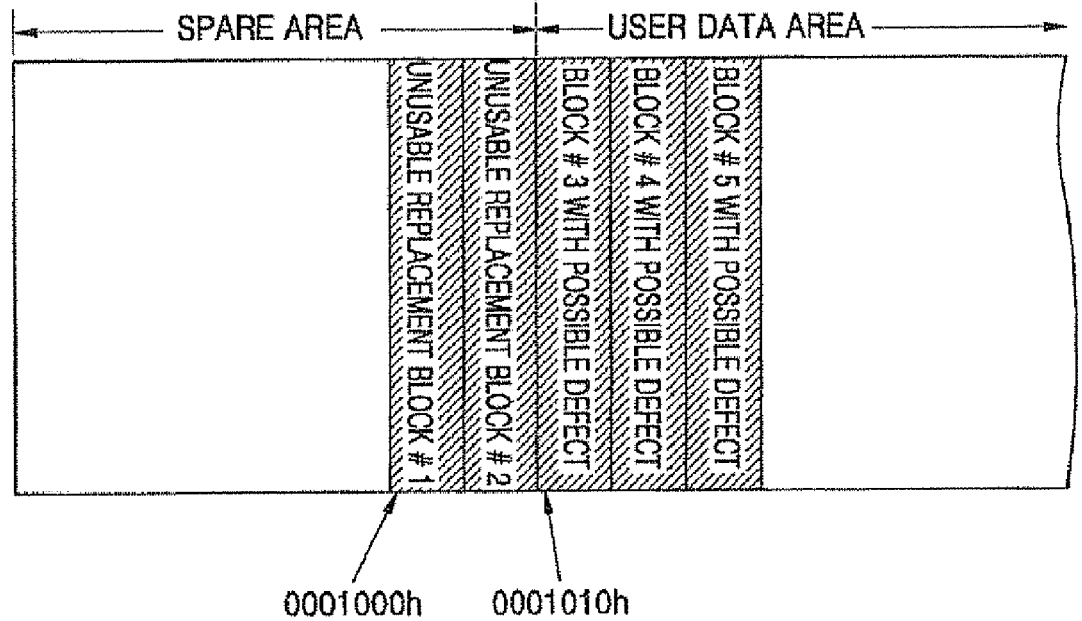

FIGS. 12A and 12B illustrate a part of sequential defect blocks with a known length of the defect existing in a newly allocated spare area, whereas the remainder of the sequential defect blocks exists in a user data area according to an embodiment of the present invention.

Referring to FIG. 12A, defect blocks #1 through #5 with a possible defect are sequentially disposed in the user data area. The defect blocks #1 through #5 with a possible defect form the sequential defect blocks. The starting address of the sequential defect blocks is shown as "0001000h."

In the present state, when the spare area is newly allocated due to re-initialization, a portion of the sequential defect blocks is included in the newly allocated spare area, while the rest is included in the user data area, as illustrated in FIG. 12B.

Referring to FIG. 12B, by newly allocating the spare area, two blocks (blocks #1 and #2) are included in the spare area, while three blocks (blocks #3 through #5) are included in the user data area. As will be described later, the blocks #3 through #5 (i.e., the sequential defect blocks) included in the user data area may still have a defect, and the blocks #1 and #2 included in the spare area become replacement blocks that cannot be used.

Figures 13A, 13B:
FIGS. 13A and 13B illustrate a change in the DLF entries from the situations illustrated in FIGS. 12A and 12B.

FIGS. 13A and 13B illustrate a change in the DLF entries from the situation illustrated in FIGS. 12A and 12B.

FIG. 13A illustrates a DFL entry of the sequential defect blocks as illustrated in FIG. 12A, that is, the DFL entry of the sequential defect blocks before re-initialization.

Referring to FIG. 13A, status information 1 of the DFL entry is set to "3," which indicates the sequential defect block may have a defect, a physical address of the defect block has registered therein "0001000h," which is a starting physical address of the sequential defect blocks, status information 2 is set to "0," which indicates that re-initialization is not yet performed, and a physical address of a replacement block is registered as "5," which indicates the length of the sequential defect blocks.

FIG. 13B illustrates a DFL entry of the sequential defect blocks as illustrated in FIG. 12B, that is, the DFL entry of the sequential defect block after re-initialization.

Referring to FIG. 13B, the defect blocks #3 through #5 with a possible defect included in the user data area even after re-initialization are the first DFL entry. That is, the first DFL entry has status information 1 set to "3," which indicates the defect blocks #3 through #5 may have a defect, a physical address of the defect block registered as "0001010h," which is a starting physical address of the sequential defect blocks, status information 2 set to "1," which indicates re-initialization has been performed, and a physical address of a replacement block registered as "3," which indicates the length of the sequential defect block.

The blocks #1 and #2, which are included in the spare area after re-initialization, are the second and third DFL entries illustrated in FIG. 13B. The second DFL entry has status information 1 set to "5," which indicates an unusable block, status information 2 set to "1," which indicates re-initialization has been performed, and a physical address of a replacement block registered as "0001000h." The third DFL entry has status information 1 set as "5," which indicates an unusable block, status information 2 set to "1," which indicates re-initialization has been performed, and a physical address of a replacement block registered as "0001001h." The sequential defect blocks in the user data area can be shown as a single DFL entry, but a DFL entry for each replacement block exists even if the replacement blocks in the spare area are in a sequence.

Figure 14A:
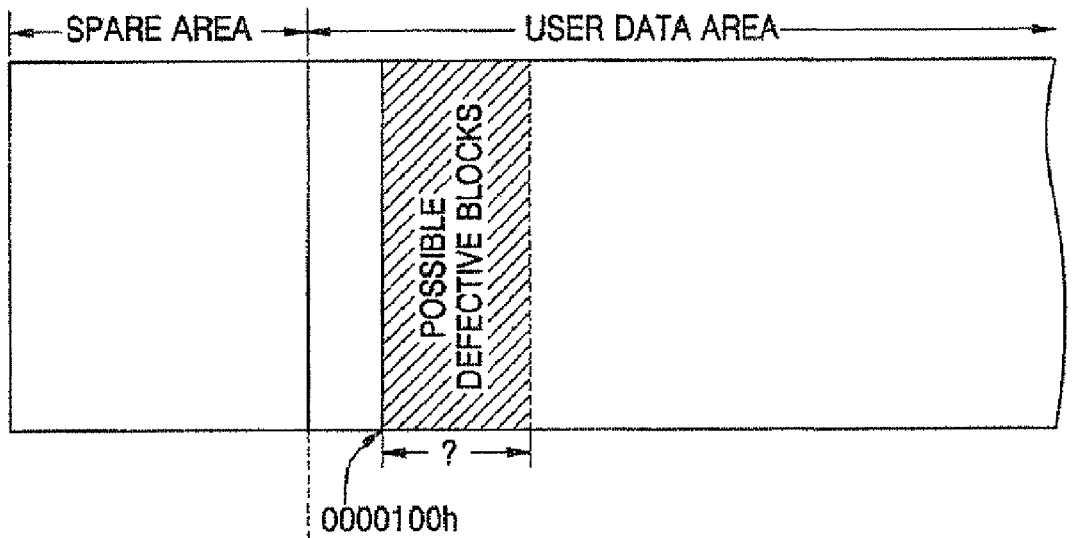
FIGS. 14A through 14C illustrate a case in which a starting address of a sequential defect block in which an unknown length of the defect is either in the spare area or the user data area by newly allocating a spare area according to an embodiment of the present invention.
Figure 14B:
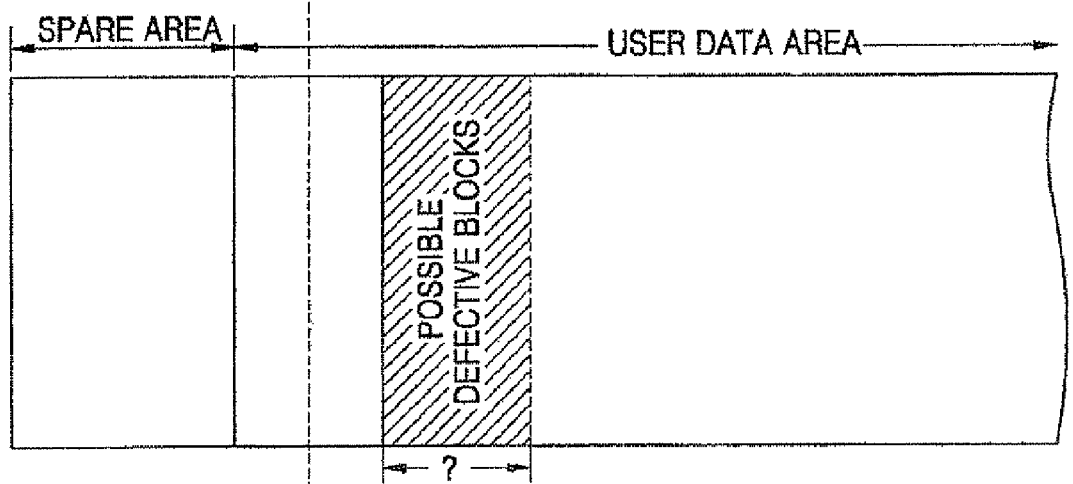
Figure 14C:
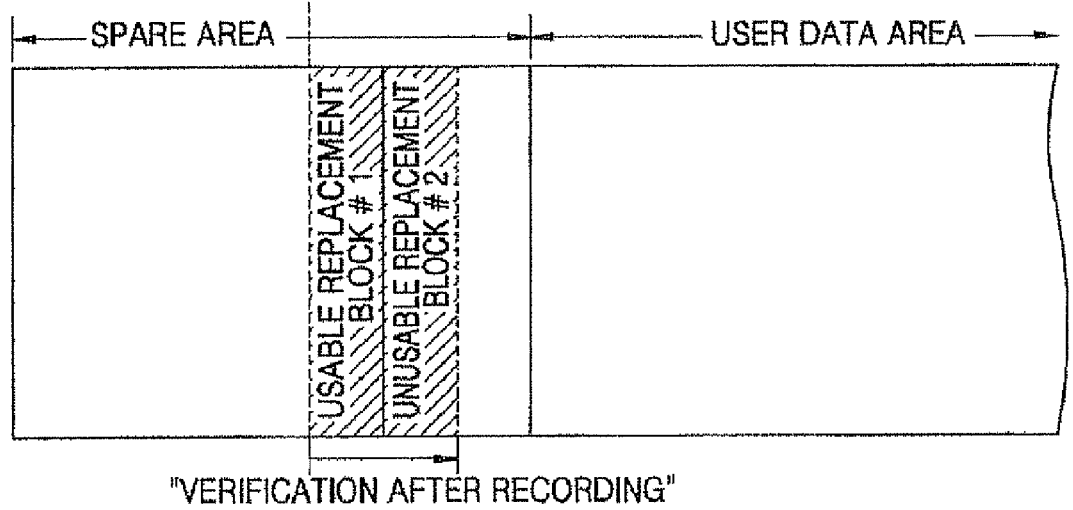

FIGS. 14A through 14C illustrate the case in which a starting address of sequential defect blocks with an unknown length of the defect is either in the spare area or the user data area by newly allocating a spare area according to an embodiment of the present invention.

There are two methods to process sequential defect blocks with an unknown length of defect through re-initialization.

One method is to verify predetermined blocks from the starting block of the sequential defect blocks by "verification after recording," and generating a DFL entry for each of the verified blocks depending on where the blocks exist (i.e., in the user data area or the spare area) after newly allocating the spare area. That is, first, "verification after recording" is performed, and if it is determined that a block in the user data area has a defect even after the spare area is newly allocated, a DFL entry according to the determination is registered. But if it is determined that the block does not have a defect, a DFL entry of the block does not need to be registered. Also, if the block in the newly allocated spare area is determined to have a defect, a DFL entry having status information indicating the block is an unusable replacement block is registered, and if the block is determined not to have a defect, a DFL entry having status information indicating the sequential block is a usable replacement block is registered.

Another method is to generate a DFL entry depending on where a starting address of the sequential defect blocks is after newly allocating a spare area. That is, when the starting address of the sequential defect blocks is included in the spare area after allocating the new spare area, predetermined blocks from a starting block at the starting address are recorded and then verified, and, according to the verification results, a DFL entry is registered. When the starting address of the sequential defect blocks is included in the user data area after allocating the new spare area, the original DFL entry is maintained. Here, status information indicating re-initialization has been performed is not indicated in status information 2, since the purpose of status information indicating re-initialization has been performed is to eliminate the unnecessary read-modify-write process when recording data on the above-mentioned blocks by the host in the future. However, if the length of the sequential blocks is unknown, the range from which physical address to which physical address of the sequential blocks with a possible defect has been re-initialized is also unclear, even if the status information indicating re-initialization has been performed is indicated. Therefore, the status information indicating that re-initialization has been performed is not included in the status information 2. This will be described in more detail with reference to FIGS. 14A through 15C.

Referring to FIG. 14A, sequential defect blocks with an unknown length are disposed in the user data area. Even though the length of the sequential defect blocks is unknown, the starting address is indicated as "0000100h."

Referring to FIG. 14B, a new spare area is allocated to the situation illustrated in FIG. 14A. After allocating the new spare area, the size of the spare area is reduced, but the starting address of the sequential defect block with the unknown length, which was in the user data area before newly allocating the spare area, still remains in the user data area. In the current situation, since the starting address of the sequential defect blocks with the unknown length remains in the user data area, it is assumed that the sequential defect blocks are also in the user data area, and the DFL entry is processed accordingly.

FIG. 14C also illustrates a new spare area allocated to the situation illustrated in FIG. 14A. After allocating the new spare area, the size of the spare area is enlarged, and the starting address of the sequential defect blocks with the unknown length that was in the user data area before newly allocating the spare area is included in the spare area. In the current situation, since the starting address of the sequential defect blocks with the unknown length is in the spare area, it is assumed that the sequential defect blocks are in the spare area, and the DFL entry is processed according to the results of performing "verification after recording" to predetermined blocks from the starting address of the sequential defect blocks.

FIGS. 15A through 15C illustrate a change in DFL entries in the situations illustrated in FIGS. 14A through 14C.

FIG. 15A illustrates the DFL entry of the sequential defect blocks before re-initialization, which is illustrated in FIG. 14A.

Referring to FIG. 15A, status information 1 of the DFL entry is set to "3," which indicates a possible defective block, a physical address of a defect block indicates a physical address of the possible defective block, status information 2 is set to "0," which indicates re-initialization has not been performed, and a physical address of a replacement block has registered therein a predetermined value "FFh" to indicate the length of the sequential defect blocks is unknown.

FIG. 15B illustrates the DFL entry of the sequential defect blocks when the starting address of the sequential defect blocks with the unknown length is included in the user data area after re-initialization, which is illustrated in FIG. 14B.

Referring to FIG. 15B, the DFL entry remains the same as the DFL entry of FIG. 15A, and status information 2 also remains set to "0," as described above.

FIG. 15C is a view of the DFL entry of the sequential defect blocks when the starting address of the sequential defect blocks with the unknown length is included in the spare area after re-initialization, which is illustrated in FIG. 14C.

Referring to FIG. 15C, when the starting address of the sequential defect blocks with the unknown length exists in the spare area, a DFL entry is registered according to the result of verifying predetermined blocks after recording the predetermined blocks from the starting address of the sequential defect blocks. For example, when there are two defect blocks in the sequential defect blocks after verifying the sequential defect blocks, and it is determined by verification that the first block is a usable block, while the second block is an unusable block, two DFL entries as illustrated in FIG. 15C are registered.

Figure 16A:
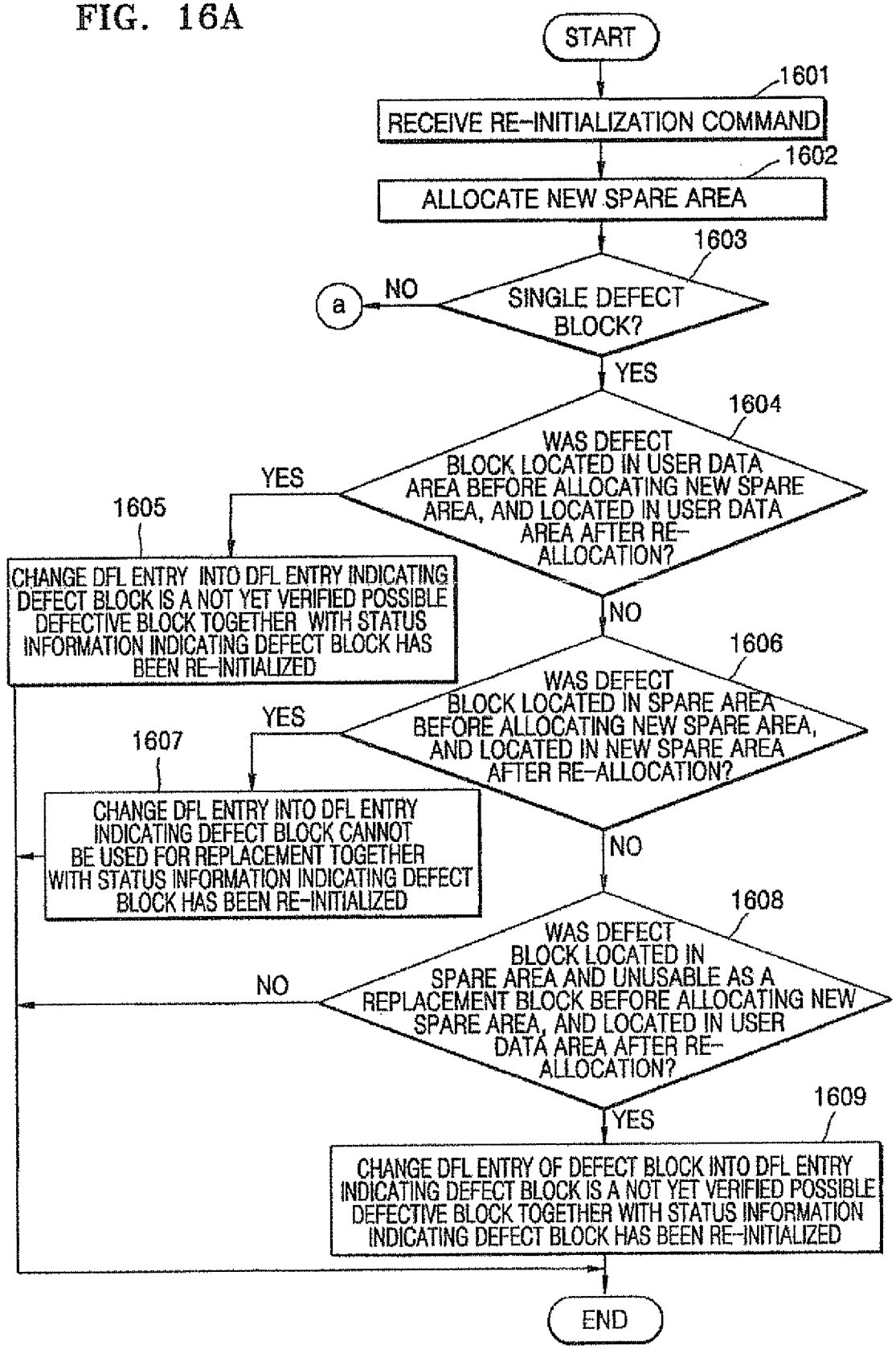
FIGS. 16A and 16B are flow charts illustrating a method of re-initializing a disc according to an embodiment of the present invention.
Figure 16B:
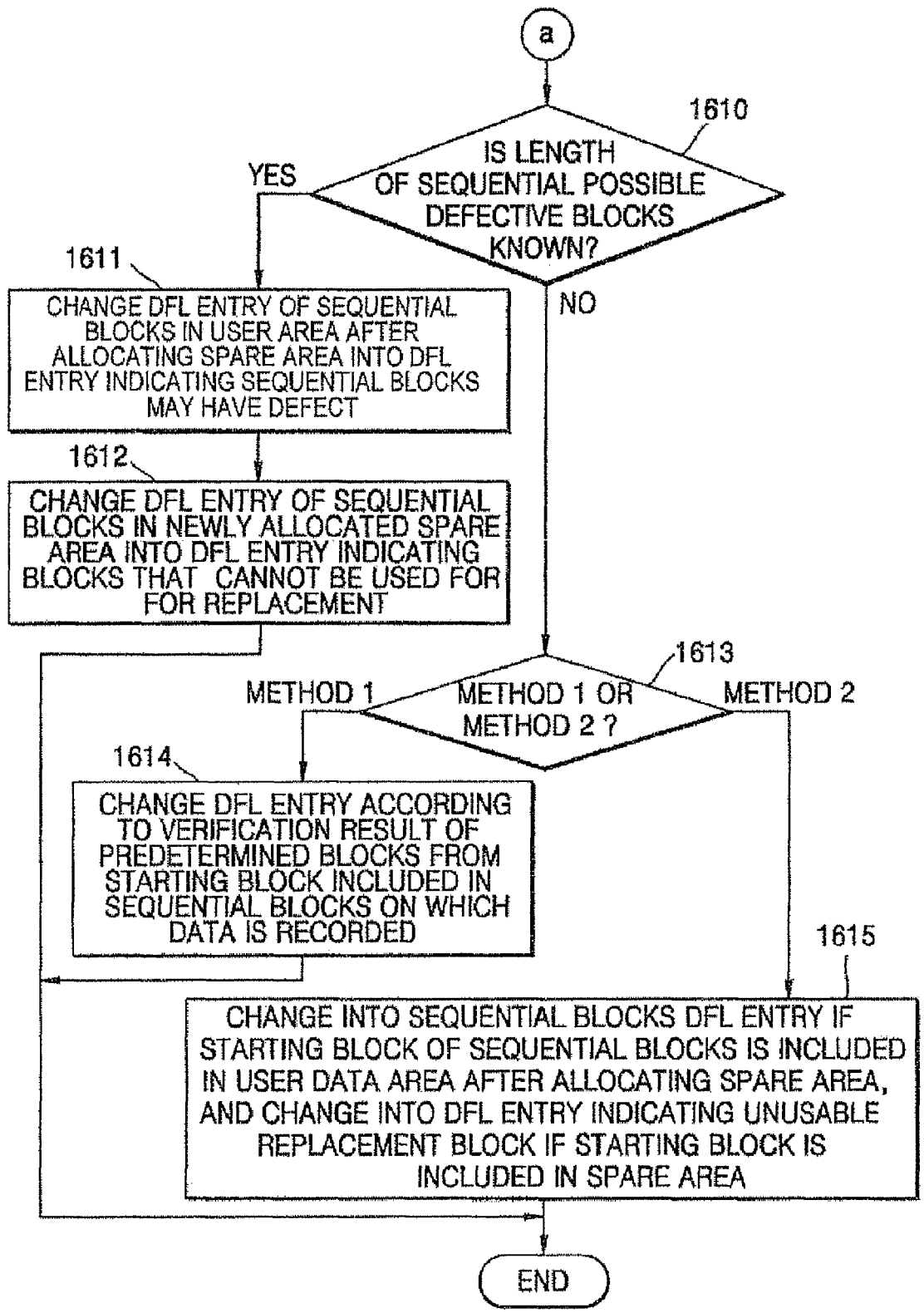

FIGS. 16A and 16B are flow charts illustrating a method of re-initializing a disc according to an embodiment of the present invention.

Referring to FIG. 16A, the disc 4 is loaded in the drive system and then the system controller 10 of the drive system receives a disc re-initialization command (1601).

When the disc re-initialization command is received, the system controller 10 allocates a new spare area in the user data area (1602).

Next, the system controller 10 changes a DFL entry according to the allocation of the spare area by determining whether a portion that is to be changed is a single defect block or sequential defect blocks (1603). If it is determined that the portion to be changed is a single defect block, the process moves on to operation 1604. But if it is determined to be sequential defect blocks, the process moves along to (a), which is illustrated in FIG. 16B.

In operation 1604, the system controller 10 determines whether the defect block included in the user data area is still included in the user data area even after allocating the new spare area.

If the determination result shows that the defect block remains in the user data area, a DFL entry of the defect block is changed into a DFL entry indicating it is a not yet verified possible defective block, together with status information indicating the defect block has been re-initialized (1605).

If the determination result shows that the defect block does not remain in the data user area, it is then determined whether the defect block that was included in the user data area is included in the spare area after re-initialization (1606).

If the determination result shows that the defect block that was included in the user data area is included in the spare area after re-initialization, a DFL entry of the defect block is changed into a DFL entry indicating that the block is unusable for replacement, together with status information indicating re-initialization has been performed (1607).

Next, when a replacement block that is unusable for replacement in the spare area is included in the user data area after allocating the new spare area (1608), the system controller 10 changes a DFL entry of the replacement block into a DFL entry indicating it is a not yet verified possible defective block along with status information indicating re-initialization has been performed (1609).

In the case in which operation 1603 determines that the portion to be changed is sequential defect blocks, the process moves on to operation 1610 (as shown by (a)) as shown in FIG. 16B. In the case of the sequential defect blocks, it is determined whether the length of the sequential possible defective block can be known (1610).

In the case of sequential possible defective blocks with a known length, status information 2 of the sequential blocks in the user data area is set to "1" after allocating the new spare area, which indicates the sequential blocks have been re-initialized, and changes a DFL entry of the sequential blocks into a sequential DFL entry (1611). A DFL entry of the sequential blocks included in the newly allocated spare area is changed into a DFL entry indicating unusable replacement blocks (1612). When a portion of the sequential possible defective blocks is included in the user data area, while the remainder of the sequential blocks is included in the newly allocated spare area by allocating the new spare area, some blocks included in the user data area are processed in operation 1611, while the other blocks included in the spare area are processed in operation 1612.

When the length of the sequential possible defective blocks is unknown, one of methods 1 and 2 can be used according to the intention of, for example, a drive manufacturer (1613).

In the case of the method 1, predetermined blocks beginning from a starting block included in the sequential blocks are verified through "verification after recording," and then, according to the verification results, a DFL entry of the sequential blocks is changed (1614). That is, according to the verification results, the sequential blocks included in the user data area after allocating the new spare area is registered as a DFL entry including status information 1 indicating it is defective or has a possible defect, and status information 2 indicating they have been re-initialized. Also, according to the verification results, the sequential blocks included in the newly allocated spare area are identified by a DFL entry including status information 1 indicating usable or unusable replacement blocks, and status information 2 indicating they have been re-initialized.

In the case of the method 2, if the starting block of the sequential blocks is included in the user data area after allocating the spare area, a DFL entry regarding the starting block is changed into a sequential block DFL entry, assuming that the rest of the blocks are also included in the user data area. If the starting block of the sequential blocks is included in the newly allocated spare area, it is assumed that the rest of the blocks are included in the spare area, and a DFL entry regarding the sequential blocks is changed into a DFL entry indicating usable or unusable replacement blocks according to verification results performed after recording.

According to the above-described present invention, by re-initializing a disc through managing defect information without recording data and then verifying the data, the re-initialization process is quickly performed. That is, by indicating re-initialization has been performed in status information 2 of a defect list entry when re-initializing the disc, re-initialization can be rapidly performed. Also, if the status information 2 of a defect list entry of a block in which data is to be recorded is set to "1" when recording data after re-initialization, a drive system knows that re-initialization has been performed, and, even if a host issues a command to record data on a portion of the block, predetermined data is immediately padded in the rest of the block without going through a separate read-modify-write process, and the data is recorded. In addition, the drive system immediately transmits null data to the host, since the data recorded on the block is invalid, or a check message can be transmitted when a reproducing command is received. Therefore, the present invention can reduce the time consumed in re-initializing the disc, and prevent an unnecessary read-modify-write process in a re-writable medium.

The recording/reproducing method can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, information data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the recording/reproducing method can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for recording data on an information recording medium comprising a data area including a user data area to store user data and a spare area to store a replacement block that replaces a defective block occurring in the user data area, and a defect management area to store a defect list in which a defect entry is recorded, the defect entry comprising location information regarding the replacement block and first status information of the replacement block, the first status information comprising a first value indicating that the replacement block is unusable, the method comprising:
    recording a new defect entry with second status information into which the defect entry with the first status information is converted during re-initialization, if the replacement block is located in the user data area after a range of the spare area is changed by re-initialization,
    wherein the second status information comprises a second value indicating that the replacement block corresponding to the new defect entry is a possible defective block.

2. The method of claim 1, wherein a physical address of the defective block is not changed.

3. A method for reproducing data from an information recording medium comprising a data area including a user data area to store user data and a spare area to store a replacement block that replaces a defective block occurring in the user data area, and a defect management area to store a defect list in which a defect entry is recorded, the defect entry comprising location information regarding the replacement block and first status information of the replacement block, the first status information comprising a first value indicating that the replacement block is unusable, the method comprising:
    reproducing a new defect entry with second status information from the information recording medium, the new defect entry with the second status information being an entry which is converted from the defect entry with the first status information during re-initialization, if the replacement block is located in the user data area after a range of the spare area is changed by re-initialization,
    wherein the second status information comprises a second value indicating that the replacement block corresponding to the new defect entry is a possible defective block.

4. The method of claim 3, wherein a physical address of the defective block is not changed.

5. An information recording medium accessible by a recording and/or reproducing apparatus, the information recording medium comprising:
    a data area comprising:
        a user data area configured to store user data and
        a spare area configured to store a replacement block that replaces a defective block occurring in the user data area; and
    a defect management area configured to store a defect list in which a defect entry is recorded, the defect entry comprising location information regarding the replacement block and first status information of the replacement block, the first status information comprising a first value indicating that the replacement block is unusable;
    wherein the defect entry with the first status information is converted to a new defect entry with second status information during re-initialization, if the replacement block is located in the user data area after a range of the spare area is changed by re-initialization, and
    wherein the second status information comprises a second value indicating that the replacement block corresponding to the new defect entry is a possible defective block.

6. The information recording medium of claim 5, wherein a physical address of the defective block is not changed.

7. An apparatus for recording data on an information recording medium, comprising:
    a pickup configured to emit a light to transfer data with respect to the information recording medium, the medium comprising a data area comprising a user data area configured to store user data and a spare area configured to store a replacement block that replaces a defective block occurring in the user data area, and a defect management area configured to store a defect list in which a defect entry is recorded, the defect entry comprising location information regarding the replacement block and first status information of the replacement block, the first status information comprising a first value indicating that the replacement block is unusable; and
    a controller configured to control the pickup to record a new defect entry with second status information into which the defect entry with the first status information is converted during re-initialization, if the replacement block is located in the user data area after a range of the spare area is changed by re-initialization,
    wherein the second status information comprises a second value indicating that the replacement block corresponding to the new defect entry is a possible defective block.

8. The apparatus of claim 7, wherein a physical address of the defective block is not changed.

9. An apparatus for reproducing data from an information recording medium, comprising:

a pickup configured to emit and receive a light to transfer data with respect to the information recording medium, the medium comprising a data area comprising a user data area configured to store user data and a spare area configured to store a replacement block that replaces a defective block occurring in the user data area, and a defect management area configured to store a defect list in which a defect entry is recorded, the defect entry comprising location information regarding the replacement block and first status information of the replacement block, the first status information comprising a first value indicating that the replacement block is unusable; and a controller configured to control the pickup to read a new defect entry with second status information from the information recording medium, wherein the new defect entry with the second status information is an entry which is converted from the defect entry with the first status information during re-initialization, if the replacement block is located in the user data area after a range of the spare area is changed by re-initialization;

wherein the second status information comprises a second value indicating that the replacement block corresponding to the new defect entry is a possible defective block.

10. The apparatus of claim 9, wherein a physical address of the defective block is not changed.

* * * * *